Oct. 29, 1935.         H. T. GAMMONS         2,019,219
                 LOCKING SLIDER FOR FASTENERS
                    Filed June 5, 1933        2 Sheets-Sheet 1
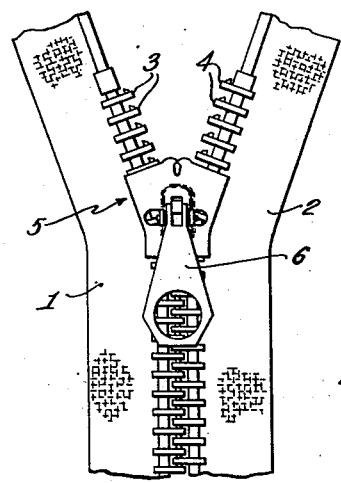
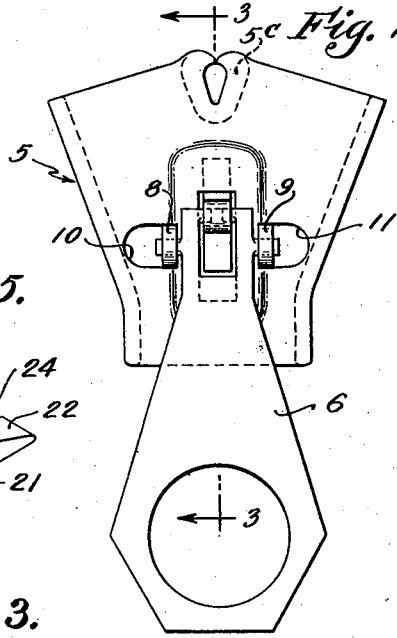
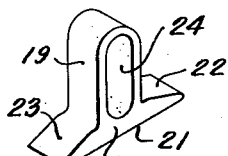
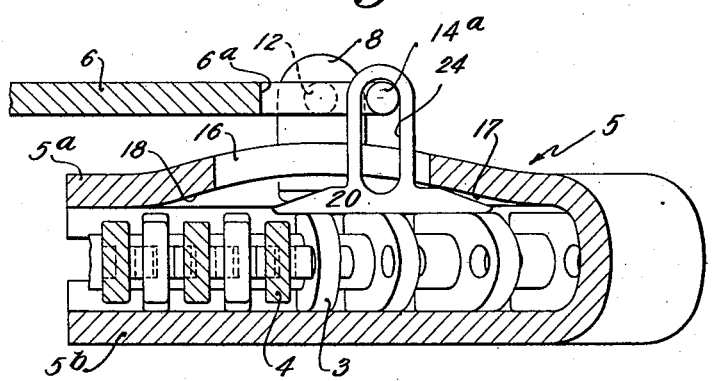
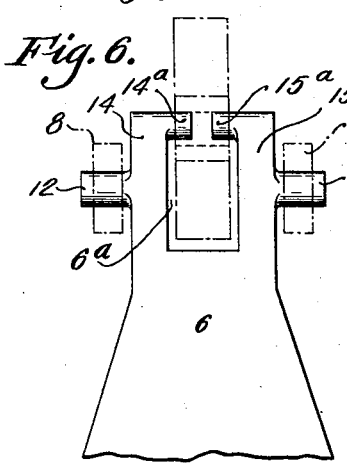
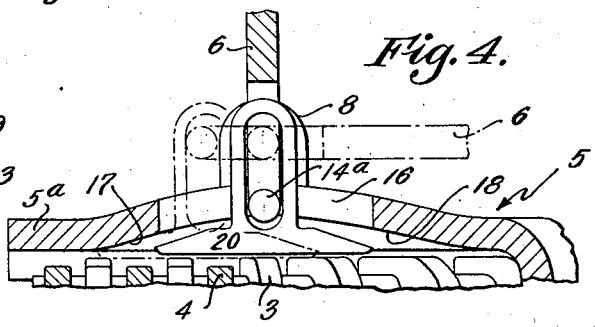
Inventor,
Herman T. Gammons,
by Roberts Cushman Woodberry
Attys.

Oct. 29, 1935.  H. T. GAMMONS  2,019,219
LOCKING SLIDER FOR FASTENERS
Filed June 5, 1933  2 Sheets-Sheet 2
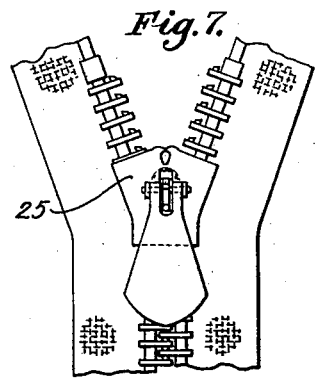
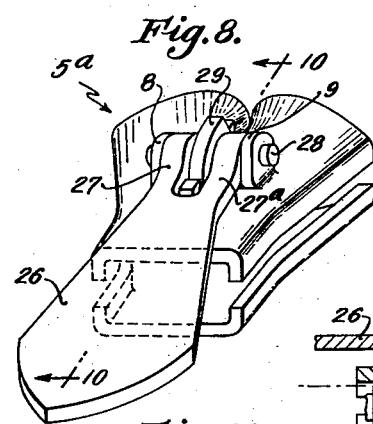
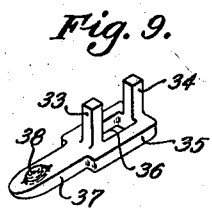
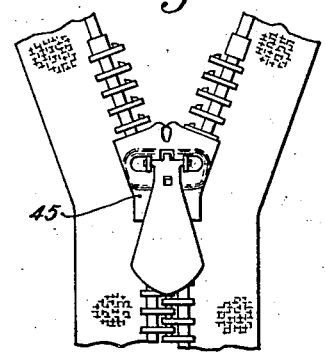
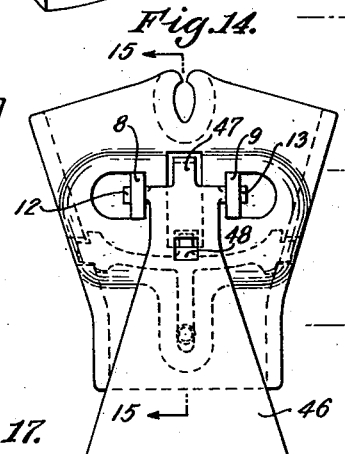
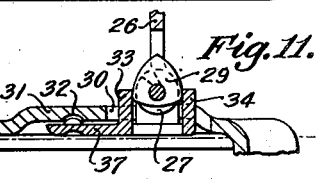
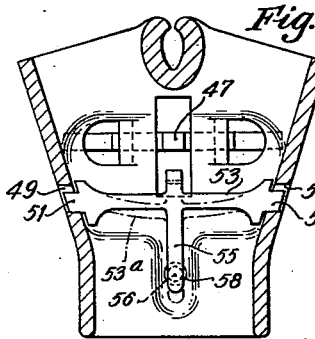
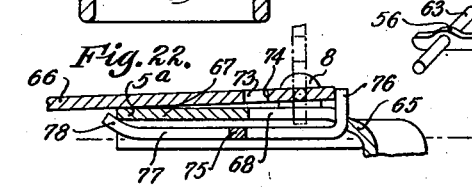
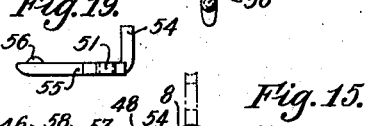
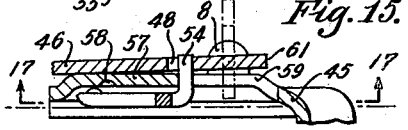
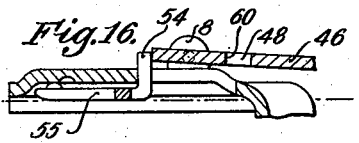
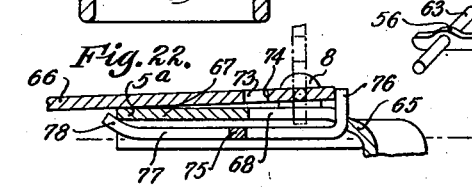
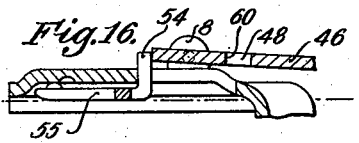
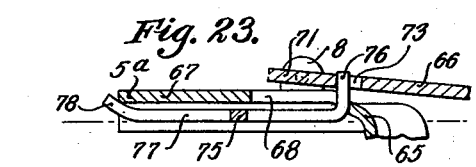
Inventor,
Herman T. Gammons,
by Roberts Cushman Woodbury
Attys.

Patented Oct. 29, 1935

2,019,219

UNITED STATES PATENT OFFICE 2,019,219

LOCKING SLIDER FOR FASTENERS

Herman T. Gammons, Natick, Mass., assignor to G. E. Prentice Manufacturing Company, New Britain, Conn., a corporation of Connecticut Application June 5, 1933, Serial No. 674,276

29 Claims. (Cl. 24—205)

This invention pertains to slide-actuated fasteners and relates more particularly to slider locking or retaining means for such fasteners. The desirability of slider locking or retaining means in fasteners of this type has long been recognized and many such locking devices have been suggested, including in particular toothed elements or hooks carried by the pull tab and adapted to enter between adjacent fastener elements. While such devices are effective for the purpose, they tend to displace the fastener elements and thereby to interfere with the proper operation of the fastener, and this difficulty has led to the employment of friction locking or retaining means, for example, devices which flex one of the slider wings toward the other so as to clamp the fastener elements between them. Obviously such an arrangement necessitates the employment of a slider having wings which are capable of yielding, but a slider of sufficiently flexible character for this purpose does not always possess the durability and stiffness essential to long use and proper action. On the other hand, certain types of slider body are very rigid in construction so that flexure of the wings is difficult if not impossible, and thus such method of locking, as above referred to, is inapplicable.

For many purposes it is desirable to provide for a double locking action, as pointed out more particularly in the patent to Prentice No. 1,778,-338; but in most instances known to me, where double locking means is associated with a pivoted pull tab, it is necessary to locate the pivotal axis of the pull tab immediately adjacent to the locking element or to that part of the slider at which the locking action takes place. Under some conditions it may become desirable to have the locking action occur at a part of the slider spaced longitudinally from the axis of the pull tab, while at the same time retaining advantages of a frictional locking action.

In accordance with the present invention I provide novel locking and retaining means wherein the locking element, preferably frictional in its character, may, if desired, be disposed in spaced relation longitudinally of the slider from the axis of the pull tab, although being moved into and out of action by manipulation of the tab. This novel locking means is readily applicable to single or double locking types of slider as desired. Furthermore, this new locking means is not dependent upon resiliency of the slider body, being in fact especially adapted for use in slider bodies of stiff and rigid construction, but at the same time this locking means in its preferred form acts by friction against the front faces of the fastener elements so as not to distort or displace such elements.

In embodying my invention in a slider body of conventional type I depart from most other locking devices known to me in that I obtain the locking pressure against the fastener elements by movement of the locking element longitudinally of the slider body, depending upon such longitudinal movement, in cooperation with the shape of the opposed faces of the locking element and slider body to exert a wedging action such as to produce a powerful and dependable locking effect.

In the accompanying drawings wherein I have illustrated certain desirable embodiments of my invention by way of example:

Fig. 1 is a fragmentary elevation illustrating a slide-operated fastener of well known type, and showing one embodiment of my improved slider applied thereto;

Fig. 2 is a front elevation, to larger scale, showing the slider removed from the fastener device;

Fig. 3 is a fragmentary longitudinal section, to larger scale, substantially on the line 3—3 of Fig. 2, showing the pull tab in one position;

Fig. 4 is a view similar to Fig. 3, but showing the pull tab in another position;

Fig. 5 is a perspective view of a locking device according to one embodiment of my invention;

Fig. 6 is a fragmentary elevation of the upper or pivotal end of the pull tab, to large scale, showing details of construction;

Fig. 7 is a view similar to Fig. 1, but illustrating a slider having a locking device of modified construction;

Fig. 8 is a perspective view, to larger scale, showing the slider of Fig. 7 removed from the fastener device;

Fig. 9 is a perspective view of a locking element useful in the construction shown in Fig. 8;

Fig. 10 is a fragmentary section on the line 10—10 of Fig. 8, showing the pull tab and locking device in one operative position;

Fig. 11 is a similar view showing the pull tab in another position, with the locking device inoperative;

Fig. 12 is another view similar to Fig. 10, but showing the pull tab in still another position, with the locking device in a second operative position;

Fig. 13 is a view similar to Fig. 1, but illustrating a slider having a locking device of further modified construction;

Fig. 14 is a front elevation of the slider of Fig.

13, to larger scale, and showing the locking element in dotted lines;

Fig. 15 is a fragmentary section substantially on the line 15—15 of Fig. 14;

Fig. 16 is a view similar to Fig. 15, but showing the pull tab in a different position;

Fig. 17 is a vertical section through the guide flanges of the front wing of the slider and in a plane substantially parallel to the front wing, illustrating the interior construction, the locking element being in neutral or inactive position;

Fig. 18 is an elevation of a locking element useful in the construction of Fig. 17;

Fig. 19 is a side elevation of the locking element of Fig. 18;

Fig. 20 illustrates a modified form of locking element which might be substituted for that of Figs. 17 and 18;

Fig. 21 is a fragmentary vertical section illustrating a modified arrangement of the slider wing for cooperation with a locking element such as shown in Figs. 9 and 18, for example;

Fig. 22 is a fragmentary section generally similar to Fig. 15, but showing a modified arrangement of locking element; and Fig. 23 is a view similar to Fig. 22, but showing the pull tab in another position.

Referring to the drawings, and particularly Figs. 1 to 6 inclusive, the fastener to which the present invention is applied is indicated as comprising flexible stringers 1 and 2, or other suitable supports, carrying respectively series 3 and 4 of fastener elements, such elements being of any usual construction, for example, as shown in the patent to Prentice No. 1,658,392, dated February 7, 1928. The series of fastener elements are as usual mounted on a beaded edge of the corresponding stringer, and are moved into and out of operative engagement by means of a slider 5 comprising front and rear wings 5ª and 5ᵇ, respectively, united by a neck 5ᶜ, said wings having lateral guide flanges which, together with the neck, define downwardly convergent guide channels for the opposed series of fastener elements. As here shown the slider body is of the general form disclosed in the patent to Prentice No. 1,900,949, dated March 14, 1933, but it is to be understood that the present invention is applicable to sliders of other specific construction.

As illustrated, the slider 5 is furnished with a pull tab 6 mounted to swing about an axis transverse of the slider body, and the front wing of the slider is provided with a pair of forwardly projecting lugs or ears 8 and 9 which furnish bearings for the pull tab. As shown, these ears or lugs 8 and 9 are formed by striking up portions of the material of the front wing, thus leaving openings 10 and 11 through the latter, but it is contemplated that these ears or lugs may be formed or applied in any other suitable manner. The upper end of the pull tab 6, as viewed in Figs. 1, 2 and 6, is narrow, as referred to the lower or finger-engaging portion, and this narrow part is provided with a pair of oppositely directed pintle members 12 and 13, respectively, which are adapted to turn in aligned bearing openings in the ears 8 and 9. The pull tab is bifurcated at its upper end, thereby providing a slot or recess 6ª extending from the upper end downwardly beyond the axis defined by the pintles 12 and 13, and the spaced portions 14 and 15 of the pull tab are provided with crank members 14ª and 15ª eccentric to the axis of the pintles 12 and 13. Under some conditions, a single crank pin may suffice, but I prefer to use two.

The front wing of the slider is furnished with an elongate slot or window 16 which extends above and below the axle of the pull tab, this window being preferably formed in a forwardly directed elongate bulge or projection in the front wing of the slider, such projection housing and providing a guideway for the locking element,—the inner walls of this projection at the points 17 and 18, above and below the ends of the window 16, being inclined relative to and merging into the inner surface of the wing, thus forming cam or wedge elements for a purpose to be described.

The slot or window 16 constitutes a guide for a forwardly projecting shank portion 19 (Fig. 5) of a locking element having a foot portion 20 which extends longitudinally of the slider body and is adapted to slide in the guideway furnished by the projection in the front wing. This foot portion preferably has a substantially flat inner face (which may be knurled, if desired) for engagement with the forward edges of the fastener elements of the opposed series at a point below the neck of the slider. This foot portion of the locking element is also provided with inclined upper surfaces 22 and 23 constituting cam or wedge elements for engagement with the inclined or cam faces 17 and 18, respectively, of the front wing of the slider. The stem or shank portion 19 of this locking element is furnished with an elongate slot 24 which receives the crank members 14ª and 15ª of the pull tab.

In assembling the parts, the shank member 19 of the locking element is passed through the slot 16 in the front wing of the slider from the inside before the slider is assembled on the stringers. The crank members 14ª and 15ª are separated sufficiently to permit their ends to be sprung over the shank 19 of the locking member into the slot 24, the parts then being bent, if necessary, to bring the axes of the crank members 14ª and 15ª into permanent alignment. The pintle members 12 and 13 are then inserted in the bearing openings in the ears 8 and 9, respectively, the latter being sprung apart for this purpose or, if preferred, initially left in properly spaced position and then bent up for insertion of the pintle members so as to bring the axes of the bearing openings into alignment and to retain the pull tab in assembled relation to the slider body. Having assembled the pull tab and the locking element with the slider body, the latter may now be mounted on the stringers, as shown in Fig. 1.

If the fastener be arranged so that upward movement of the slider causes the opposed series to be brought into engagement, the slider being at the upper end of the series at the end of the closing movement, it then suffices to swing the pull tab 6 down into the position of Figs. 1, 2 and 3, when the slider movement is completed, thereby causing the crank members 14ª and 15ª to push the locking member upwardly with reference to the slider body and longitudinally of the fastener elements. This upward movement causes the cam member 22 of the locking element to engage the inclined surface 17 of the slider wing, thereby forcing the locking element rearwardly against the fastener elements so as to wedge the latter against the rear wing, locking the slider in adjusted position.

When the fastener is to be opened, the pull tab 6 is moved substantially to the full line position of Fig. 4, thereby causing the crank members 14ª and 15ª positively to move the locking element down into mid-position, where it is free to retreat from the fastener elements, thereby freeing the slider for movement. If the fastener be so arranged that downward movement of the slider closes the fastener, then at the end of the closing movement the pull tab may be swung into the broken line position of Fig. 4, thereby causing the wedge or cam surface 23 of the locking element to engage the inclined surface 17 of the slider body, and thus forcing the locking element rearwardly to lock the slider in position.

Referring to Figs. 7 to 12 inclusive, a modified construction is illustrated. In these figures the slider body 25 may be of any usual construction, similar, for example, to the slider body 5 above described and comprising front and rear wings united by a neck. The slider is provided with a pull tab 26 which in this instance is bifurcated at its upper end to provide the spaced parallel arms 27 and 27ᵃ. The slider body is furnished with a pair of upstanding lugs or ears 8 and 9 and with a slot 30 in the front wing intermediate said ears, this slot preferably being formed in a forward elongate bulge or projection 31 of the front wing, such projection furnishing a channel or guideway in the inner surface of the front wing for the reception of the locking element. The inner surface of the wall of this channel is provided with a recess 32 for a purpose hereinafter described.

In this instance the pull tab is pivotally united to the slider body by means of a short trunnion or shaft 28 turning in aligned bearing openings in the ears or lugs 8 and 9, and about this shaft the ends of the parts 27 and 27ᵃ are curled or bent as illustrated in Figs. 10 and 11. Mounted on this shaft 28, intermediate the members 27 and 27ᵃ, is a cam 29, preferably of shield shape, as shown in Figs. 10, 11, and 12. This cam is mounted in fixed relation to the pull tab in substantially the relative position illustrated in Fig. 10, for example, and the pull tab and cam may, if desired, both be soldered, brazed or otherwise secured to the shaft 28.

The locking element employed in this construction is shown in Fig. 9 and comprises forwardly projecting longitudinally spaced contact elements 33 and 34 which are so disposed as to receive the cam 29 between them, the cam being so shaped that it normally contacts at diametrically opposite points with the parts 33 and 34, thereby keeping the locking element always under positive control. This locking element comprises the fastener-engaging foot or shoe 35 (the rear surface of which, if desired, may be knurled, although this is not necessary), and from this part 35 projects the elongate member 37 which, as here shown, extends toward the lower end of the slider body, the locking element being disposed within the guide channel in the projecting portion 31 of the front wing. The part 35 is furnished with a slot 36 intermediate the parts 33 and 34, and the part 37 is provided with an upstanding boss, wedge, or cam element 38.

After assemblage of the slider parts, the slider is mounted upon the stringers, as shown in Fig. 7, and when the pull tab 26 is disposed substantially perpendicular to the front of the slider body, as shown in Fig. 11, the arrangement of the cam and the contact members 33 and 34 is such that the locking element occupies the position shown in Fig. 11, with the boss 38 disposed in the recess 32. In this position the locking element exerts no substantial pressure on the fastener elements and thus the slider may freely be moved up or down. On the other hand, if the pull tab 26 be moved to the position shown in Fig. 10, the boss 38 is moved downwardly out of the recess 32 by the cam 29, which acts upon the contact member 33, and in so moving out of the recess the cooperating curved or cam surfaces of the recess and boss force the locking member rearwardly against the fastener elements, thus locking the slider in position. To unlock the slider the pull tab is swung back to the position of Fig. 11, whereupon the cam 29, acting on the part 34, pulls the locking element back to its inoperative position. On the other hand, if the pull tab 26 be swung to the position of Fig. 12, the cam 29, acting on the contact member 34, pulls the locking element upwardly and again causes the boss 38 to move out of the recess 32, thereby exerting pressure against the fastener elements to lock the slider in position.

Instead of a mere recess or depression 32 in the wing of the slider, the wing may be furnished with a perforation or opening 32ᵃ (Fig. 21) in which the boss 38 may be housed when the locking element is inoperative but from which the boss is withdrawn in one direction or the other for accomplishing the locking action.

In Figs. 13 to 18, another modification is illustrated, the slider body 45 being furnished in this instance with a pull tab 46 having integral pintle members 12 and 13 which are mounted to turn in aligned bearing openings in lugs or ears 8 and 9 in the same way as in the construction of Figs. 1 and 2. However, in this instance the upper end of the pull tab is furnished with a tongue 47 arranged to swing in a slot 59 in the front wing of the slider. At a point below the axis defined by the pintle members 12 and 13, the pull tab is also furnished with an opening 48.

The side flanges of the front wing of the slider are furnished with openings 49 and 50 (Fig. 17) adapted to receive lugs 51 and 52, respectively, at the opposite ends of a stiffly resilient crossbar 53 (Fig. 18) forming part of a locking element. This locking element is furnished with a forwardly projecting arm 54 (Fig. 19) disposed in the slot or opening in the front wing of the slider body and is also provided with a downwardly extending arm 55 carrying a boss or cam projection 56 which is adapted to enter a recess 58 in the inner surface of a forward projection or bulge 57 in the front wing of the slider, such recess corresponding to the recess 32 illustrated in Fig. 12.

After the parts of the slider have been assembled and mounted upon the stringers, the slider is freely movable longitudinally of the latter so long as the pull tab is disposed in a position substantially perpendicular to the front wing of the slider, as illustrated in broken lines in Fig. 15. In this position, the resiliency of the locking element is such that said locking element occupies the location shown in full lines in Fig. 17 wherein the cam boss or lug 56 is disposed within the recess 58. However, if the pull tab 46 be swung down into the full line position of Fig. 15, the edge 60 of the opening 48 in the pull tab engages the member 54, and as the pull tab approaches a position in which it is substantially parallel to the front wing, the member 54 is pushed downwardly, thereby forcing the boss 56 out of the recess 58, so that the locking element is wedged toward the fastener elements, thereby retaining the slider in position. Preferably the pull tab, when in its locking position, is moved slightly rearward beyond a plane parallel to that of the front wing so that the reaction between the parts is such as to retain them in locking position.

When the pull tab is swung upwardly into substantially parallel relation to the front wing, as shown in Fig. 16, the end 61 of the tongue 47 of the pull tab engages the contact member 54 and also pushes the locking element downwardly to disengage the boss 56 from the recess 58, thereby again locking the slider. It may be noted that in this construction the approach of the pull tab to either of two positions substantially 180° apart causes the locking element to move in the same direction and into locking position. However, in this construction the locking element is not positively returned to inactive position by the pull tab but must be restored by the resiliency of the bar 53.

In Fig. 20 a modification of the device of Fig. 18 is illustrated,—the locking element 55ᵃ having the forwardly projecting contact member 54ᵃ and being mounted upon an independent member 63 which may be a piece of spring steel wire having the necessary resiliency for restoring the locking element to inoperative position when released by the pull tab.

In Figs. 22 and 23 a further modification is illustrated in which the slider body 65 is furnished with a pull tab 66 pivotally supported in lugs or ears such as the lugs 8 and 9 of Figs. 1 and 14. The front wing of the slider is furnished with a slot 68, and the pull tab is provided with a tongue 71 projecting upwardly beyond the pivotal axis similar to the tab of Fig. 14. The pull tab is also furnished with an opening 73, the upper wall 74 of which constitutes a cam element. In this instance the locking device may be supported by a resilient crossbar 75 substantially like that of Fig. 17, for example, but comprises an upwardly extending part, having the forwardly projecting contact member 76, and a downwardly extending part 77 furnished with the bent cam or wedge portion 78.

When the pull tab is substantially perpendicular to the front wing, as shown in broken lines in Fig. 22, the locking element occupies its neutral, inactive position with the cam end 78 wholly below the lower end of the slider wing. In this position the locking element does not exert any substantial pressure against the fastener units, so that the slider is free to move. If the pull tab be swung down to the position shown in full lines in Fig. 22, the end of tongue 71, acting on the part 76, pushes the locking element upwardly so that its bent end 78 engages the lower end of the slider wing and thereby is forced inwardly to press against the fastener units and lock the slider in position. On the other hand, if the pull tab be swung to the position of Fig. 23, its cam element 74 engages the member 76 and likewise pushes the locking element upwardly, so that again its bent end 78 engages the lower end of the slider wing, thereby locking the slider in position.

In the above description reference has been made to the "upper" and "lower" ends of the slider body and to "upward" and "downward" movement of the slider, but it is to be understood that these terms are employed merely for convenience in referring to the drawings and are not to be regarded as limiting the use of the slider or its arrangement upon the stringers. Moreover, when reference is made herein to the "plane" of the pull tab, it is not intended thereby to indicate that the pull tab is mathematically flat, but only to refer to the general form of the pull tab in which the finger-engaging portion usually is broad and more or less approaches a flat form. Further, when reference is made to the axis of the pull tab as "transverse" to the slider body, this is intended to indicate that such axis is substantially at right angles to the direction of movement of the slider, in opening and closing the fastener, and to the plane substantially parallel to the front wing of the slider. When herein I have employed the term "cam" or "cam means" I intend thereby to include any equivalent device or arrangement as, for example, the elements specifically referred to as cranks in the construction illustrated in Fig. 3.

While I have herein illustrated various embodiments of the invention by way of example, it is to be understood that the invention is not necessarily limited to the illustrated constructions, but that any equivalent arrangement falling within the scope of the appended claims may be regarded as in contemplation of the invention.

I claim:

1. A slider of the class described comprising front and rear wings and means uniting the wings, said slider having surfaces defining guide channels for opposed series of interengageable fastener elements, a movable pull tab mounted on the slider, a locking member having a part disposed between the inner surface of the front wing and the fastener elements, said locking member being movable, independently of the pull tab, longitudinally of the slider, locking-member guide means carried by the slider, and actuating means carried by the pull tab operative to move the locking member bodily, lengthwise of the slider, into locking position.

2. A slider of the class described comprising front and rear wings and means uniting the wings, said slider having surfaces defining guide channels for opposed series of interengageable fastener elements, a movable pull tab mounted on the slider, a locking member movable, independently of the pull tab, longitudinally of the slider, said locking member having a part interposed between the fastener elements and one wing of the slider, and actuating means carried by the pull tab operative positively to move the locking member longitudinally of the slider into and out of locking position.

3. A slider of the class described comprising front and rear wings and means uniting the wings, said slider having surfaces defining guide channels for opposed series of interengageable fastener elements, a movable pull tab mounted on the slider, a wedge member interposed between one wing of the slider and the fastener elements, means constraining said wedge member always to move in a path substantially parallel to the plane of the front wing of the slider, and actuating means operative by the pull tab for moving said wedge member longitudinally of the slider from an inoperative position to an operative position, in the latter of which positions it presses the fastener elements against the other wing of the slider thereby to retain the slider in adjusted position.

4. A slider of the class described comprising front and rear wings and means uniting the wings, said slider having surfaces defining guide channels for opposed series of interengageable fastener elements, a movable pull tab mounted on the slider, a double wedge member movable longitudinally of the slider, wedge-member guide means carried by the slider, said wedge member being operative to lock the slider in adjusted position when moved longitudinally of the slider in either direction from an inoperative position, and means carried by the pull tab operative to move the wedge member into either of its operative positions.

5. In combination in a fastener of the class described having opposed series of interengageable fastener elements, of a slider for moving the series of elements into engaging relation, said slider having a substantially rigid body comprising front and rear wings united by a neck, a movable pull tab mounted on the slider, locking means including a movable part interposed between the inner surface of one wing and the fastener elements, said part being movable longitudinally of the slider in a direction substantially parallel to the plane of the front wing of the slider, the locking means being operative to exert a wedging pressure between the front wing and the fastener elements when moved in a predetermined direction, and a cam carried by the pull tab operative to shift said movable part in said predetermined direction.

6. A slider of the class described comprising front and rear wings and means uniting the wings, said slider having surfaces defining guide channels for opposed series of interengageable fastener elements, a movable pull tab mounted on the slider, said pull tab being pivoted to turn about an axis transverse of the slider, a locking member movable longitudinally of the slider, and a crank pin carried by the pull tab, said crank pin being disposed and arranged to engage an element of the locking member as the pull tab is turned, and thereby to move the locking member into locking position.

7. A slider of the class described comprising front and rear wings and means uniting the wings, said slider having surfaces defining guide channels for opposed series of interengageable fastener elements, a movable pull tab mounted on the slider, a locking member movable longitudinally of the slider, said locking member having a part provided with an elongate slot extending substantially perpendicular to the plane of the front wing of the slider, and a pin carried by the pull tab and disposed in said slot and operative by movement of the pull tab to move the locking member toward and from locking position.

8. A slider of the class described comprising front and rear wings and means uniting the wings, said slider having surfaces defining guide channels for opposed series of interengageable fastener elements, a movable pull tab mounted on the slider, said pull tab being pivoted to swing through an arc of substantially 180° about an axis transverse of the slider, a locking member movable longitudinally of the slider, said member having a part provided with an elongate slot extending substantially perpendicular to the plane of the front wing of the slider, and a crank pin carried by the pull tab and disposed in said slot, the locking member together with the slot therein and the crank pin being so dimensioned and arranged that, as the pull tab is swung in either direction from a position substantially at right angles to the plane of the front wing, the locking member is moved to operative position.

9. A slider of the class described comprising front and rear wings and means uniting the wings, said slider having surfaces defining guide channels for opposed series of interengageable fastener elements, a movable pull tab mounted on the slider, one wing of the slider having a recess in its inner surface, the inner wall of the recess merging by inclined surfaces into the inner face of the wing, a locking member having a part normally housed in said recess, and means operable to move said locking member in either direction into engagement with one or the other of said inclined surfaces thereby forcing the locking member toward the fastener elements so as to hold the slider in adjusted position.

10. A slider of the class described comprising front and rear wings and means uniting the wings, said slider having surfaces defining guide channels for opposed series of interengageable fastener elements, a movable pull tab mounted on the slider, one wing of the slider having a longitudinally extending recess in its inner surface, the inner wall of the recess merging by inclined surfaces at the respective ends of the recess into the inner face of the wing, a locking member having a part normally housed in said recess wherein it exerts substantially no pressure against the fastener elements, and means actuable by the pull tab to move the locking member longitudinally into contact with one or the other of said inclined surfaces thereby forcing the locking member into frictional contact with the fastener elements so as to retain the slider in adjusted position.

11. A slider of the class described comprising front and rear wings and means uniting the wings, said slider having surfaces defining guide channels for opposed series of interengageable fastener elements, a movable pull tab mounted on the slider, one wing of the slider having an elongate guideway in its inner surface, a locking member, movable independently of the pull tab, having a part disposed in said guideway, said locking member having a holding surface normally out of holding engagement with the fastener elements and an inclined surface engageable with a complemental surface of the slider wing, and locking-member actuating means operable by the pull tab positively to move said locking member along the guideway so as to bring said inclined surface into operative contact with the complemental surface of the slider wing thereby to force the holding surface of the locking member against the fastener elements.

12. In combination, in a fastener of the class described having opposed series of interengageable fastener elements, of a slider for moving said series of elements into engaging relation, said slider having a body comprising front and rear wings united at one end by a neck portion, and locking means including a movable part interposed between the inner surface of the front wing and the series of fastener elements, said part having spaced elements arranged to receive pressure exerting means between them, the part being movable longitudinally of the slider toward and from the neck of the slider, and a manually movable actuator, independent of said movable part and carried by the slider, said actuator having pressure exerting means interposed between and engageable alternatively with the respective spaced elements of the movable part as the actuator is moved in one or the other direction, thereby to move said part in either direction from an intermediate position, the locking means including complemental wedge surfaces, one of which is carried by said movable part and the other of which is carried by the slider wing, said surfaces being so disposed that when said part is moved in one direction it exerts wedging pressure against the front wing and against the fastener elements respectively, thereby forcing the latter against the rear wing.

13. A slider of the class described comprising front and rear wings and means uniting the wings, said slider having surfaces defining guide channels for opposed series of interengageable fastener elements, a movable pull tab mounted on the slider, the pull tab being movable through an arc of substantially 180°, a locking member movable longitudinally of the slider from inoperative position to an operative position, and means, carried by the pull tab, operative, as the pull tab is caused to approach either of two locking positions substantially 180° apart, to move the locking member from inoperative to an operative position.

14. A slider of the class described comprising front and rear wings and means uniting the wings, said slider having surfaces defining guide channels for opposed series of interengageable fastener elements, a movable pull tab mounted on the slider, the pull tab being pivoted to swing about an axis transverse of the slider and through an angle of substantially 180°, a locking member movable longitudinally of the slider from a single inoperative position to a single operative position, and means carried by the pull tab, operative, as the pull tab approaches either of two positions substantially 180° apart, to move the locking member from the inoperative to the operative position.

15. A slider of the class described comprising front and rear wings and means uniting the wings, said slider having surfaces defining guide channels for opposed series of interengageable fastener elements, a movable pull tab mounted on the slider, the pull tab being pivoted to swing about an axis transverse of the slider through an angle of substantially 180°, a movable locking member carried by the slider, said locking member being movable bodily longitudinally of the slider from a single inoperative to a single operative position, means carried by the pull tab operative, as the tab approaches either of two positions, respectively, substantially 180° apart, positively to move the locking member from said inoperative to said operative position, and restoring means operative to return the locking member to said inoperative position when the pull tab is substantially midway between the aforesaid positions.

16. A slider of the class described comprising front and rear wings and means uniting the wings, said slider having surfaces defining guide channels for opposed series of interengageable fastener elements, a movable pull tab mounted on the slider, a wedge member, movable independently of the pull tab, interposed between one wing of the slider and the fastener elements, said wing having a longitudinally extending recess in its inner surface for the reception of the wedge member when the latter is inoperative, and means carried by the pull tab operative positively to move the wedge member out of said recess and into operative position in which it presses the fastener elements against the other wing of the slider thereby to hold the slider in adjusted position.

17. A slider of the class described comprising front and rear wings and means uniting the wings, said slider having surfaces defining guide channels for opposed series of interengageable fastener elements, a movable pull tab mounted on the slider, a wedge member movable independently of the pull tab, interposed between one wing of the slider and the fastener elements, said wing having a longitudinally extending recess in its inner surface for the reception of the wedge member when the latter is inoperative, the inner wall of the recess merging by an inclined end surface into the inner surface of the wing, and means carried by the pull tab operative positively to move the wedge member into engagement with said inclined surface thereby to exert a wedging action against the fastener elements so as to press the latter against the other wing of the slider.

18. A slider of the class described comprising front and rear wings and means uniting the wings, said slider having surfaces defining guide channels for opposed series of interengageable fastener elements, a movable pull tab mounted on the slider, the pull tab being pivoted to swing about an axis transverse of the slider and through an arc of substantially 180°, a wedge member movable longitudinally of the slider and operative to lock the slider in adjusted position when moved in either direction from an intermediate inoperative position, and means operable by the pull tab, as the latter approaches either of two positions substantially 180° apart, to move the wedge member to operative position.

19. A slider of the class described comprising front and rear wings and means uniting the wings, said slider having surfaces defining guide channels for opposed series of interengageable fastener elements, a movable pull tab mounted on the slider, the pull tab being pivoted to swing through an arc of substantially 180° about an axis transverse of the slider, a double wedge member movable longitudinally of the slider and operative to lock the slider in adjusted position when the wedge is moved in either direction from an intermediate inoperative position, and means operable by the pull tab, as the latter approaches either of two positions substantially 180° apart, to move the wedge member from inoperative to operative position, said operating means also acting to restore the wedge member to inoperative position when the pull tab is moved to a point intermediate said positions.

20. A slider of the class described comprising front and rear wings and means uniting the wings, said slider having surfaces defining guide channels for opposed series of interengageable fastener elements, a movable pull tab mounted on the slider, a locking member movable, independently of the pull tab, in a substantially rectilinear path, toward and from locking position, guide means for the locking member, and a cam element carried by the pull tab operative to move said locking member from inoperative to an operative slider-locking position.

21. A slider of the class described comprising front and rear wings and means uniting the wings, said slider having surfaces defining guide channels for opposed series of interengageable fastener elements, a movable pull tab mounted on the slider, a locking member movable longitudinally of the slider, guide means for the locking member on the slider, said locking member having a part projecting substantially perpendicular to the plane of the front wing of the slider, and a cam carried by the pull tab and movable by the latter, said cam being engageable with said projecting part and operative to move the locking member from inoperative to operative position.

22. A slider of the class described comprising front and rear wings and means uniting the wings, said slider having surfaces defining guide channels for opposed series of interengageable fastener elements, a movable pull tab mounted on the slider, a locking member movable longitudinally of the slider, means carried by the locking member providing a pair of spaced parallel contact elements extending substantially perpendicular to the plane of the front wing of the slider, and cam means actuable by the pull tab and engageable with said contact elements and operative to move the locking member to and from operative position in accordance with the direction of movement of the pull tab.

23. A slider of the class described comprising front and rear wings and means uniting the wings, said slider having surfaces defining guide channels for opposed series of interengageable fastener elements, a movable pull tab mounted on the slider, a locking element movable, independently of the pull tab, longitudinally of the slider from an operative to an inoperative position, supporting and guiding means carried by the slider operative to support and guide said locking element in its movement, said locking element, when in inoperative position, being disposed below the lower end of the slider wing, and actuating means, carried by the pull tab, operative to move said locking element upwardly relative to the slider body into locking position.

24. A slider of the class described comprising front and rear wings and means uniting the wings, said slider having surfaces defining guide channels for opposed series of interengageable fastener elements, a movable pull tab mounted on the slider, a locking member movable, independently of the pull tab, longitudinally of the slider from an operative to an inoperative position, supporting and guiding means carried by the slider operative to support and guide said locking member in its movement, said locking member having a part provided with an inclined surface adapted by engagement with the lower edge of the slider wing to exert a wedging action against the fastener elements, said inclined surface being disposed, when the locking member is inoperative, below said lower edge of the slider wing, and means actuated by the pull tab positively to move the locking member upwardly thereby to bring said inclined surface into operative contact with the lower edge portion of the slider wing.

25. A slider of the class described comprising front and rear wings united by a neck, longitudinally movable locking means carried by the slider, a pull tab comprising a pintle member and a crank spaced from the axis of the pintle member, and bearing means carried by the slider, said bearing means having an opening within which the pintle member is arranged to turn, the crank cooperating with the locking means to move the latter longitudinally of the slider as the pull tab is swung about the axis of its pintle.

26. A slider of the class described comprising front and rear wings united by a neck, locking means carried by the slider comprising an element movable longitudinally of the slider, said element having a part provided with a slot extending substantially perpendicular to the plane of the front wing of the slider, and a manually operable actuating member pivotally supported by the slider and having a crank disposed within said slot.

27. A slider of the class described comprising front and rear wings united by a neck, a pull tab pivotally supported by the slider, and locking means carried by the slider comprising a part movable relatively to the front wing of the slider and in a path substantially parallel to the plane of said wing, and a shield-shaped cam carried by the pull tab and operative to actuate said movable part.

28. A slider of the class described comprising front and rear wings and a neck, locking means carried by the slider comprising a member movable relatively to the front wing in a path substantially parallel to the plane of the latter, resilient means normally holding said member in a predetermined position, a movable pull tab carried by the slider, and cam means carried by the pull tab operative to move said member to another position in opposition to said resilient holding means.

29. A slider of the class described comprising front and rear wings and means uniting the wings, said slider having surfaces defining guide channels for opposed series of interengageable fastener elements, pull-tab bearing means carried by the slider, said bearing means defining an axis extending transversely of the slider, a pull tab supported by said bearing means to turn about said axis, a locking member bodily movable in a substantially rectilinear path longitudinally of the slider from inoperative to operative position, and actuating means carried by the pull tab operative to move said locking means along said path into slider locking position.

HERMAN T. GAMMONS.